United States Patent
Guinart et al.

(10) Patent No.: US 10,787,047 B2
(45) Date of Patent: Sep. 29, 2020

(54) METHOD FOR PAIRING A MEASUREMENT MODULE MOUNTED IN A MOTOR VEHICLE WHEEL

(71) Applicants: Continental Automotive France, Toulouse (FR); Continental Automotive GmbH, Hannover (DE)

(72) Inventors: Nicolas Guinart, Toulouse (FR); Antoine Richard, Lacroix-Falgarde (FR); Sylvain Godet, Saint-Cezert (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/471,251

(22) PCT Filed: Dec. 18, 2017

(86) PCT No.: PCT/FR2017/053648
§ 371 (c)(1),
(2) Date: Jun. 19, 2019

(87) PCT Pub. No.: WO2018/115680
PCT Pub. Date: Jun. 28, 2018

(65) Prior Publication Data
US 2020/0086698 A1    Mar. 19, 2020

(30) Foreign Application Priority Data
Dec. 22, 2016 (FR) .................. 16 63129

(51) Int. Cl.
*B60C 23/00* (2006.01)
*B60C 23/04* (2006.01)
(Continued)

(52) U.S. Cl.
CPC ...... *B60C 23/0489* (2013.01); *B60C 23/0416* (2013.01); *G01B 21/22* (2013.01); *B60T 8/171* (2013.01); *B60T 2270/10* (2013.01)

(58) Field of Classification Search
CPC . B60C 23/0489; B60C 23/0416; G01B 21/22; B60T 8/171; B60T 2270/10
(Continued)

(56) References Cited

U.S. PATENT DOCUMENTS

| 6,922,140 B2 | 7/2005 | Hernando et al. |
| 7,230,525 B2 | 6/2007 | Hirai |

(Continued)

FOREIGN PATENT DOCUMENTS

| EP | 1403099 A1 | 3/2004 |
| EP | 1616723 A1 | 1/2006 |

OTHER PUBLICATIONS

International Search Report and Written Opinion for International Application No. PCT/FR2017/053648, dated Apr. 10, 2018, 7 pages.

(Continued)

*Primary Examiner* — John H Le
(74) *Attorney, Agent, or Firm* — RatnerPrestia

(57) ABSTRACT

A method for pairing a measurement module with a wheel of a motor vehicle. The method is implemented by a computer and includes, for each received measured signal, determining the power of the measured signal, determining the angular orientation of each wheel and identifying, in a plurality of tables, a row and column pair including the determined power and the angular orientation of each wheel. The pairing being performed when, for a number of determined columns of each table higher than a first minimum threshold, the number of row and column pairs identified in one table is lower than a predetermined maximum threshold (Continued)

and the number of row and column pairs identified in the other tables is higher than a second minimum threshold.

15 Claims, 9 Drawing Sheets

(51) Int. Cl.
    *G01B 21/22*     (2006.01)
    *B60T 8/171*     (2006.01)

(58) Field of Classification Search
    USPC .......... 702/138, 150, 151; 340/447; 73/146; 701/300
    See application file for complete search history.

(56) References Cited

U.S. PATENT DOCUMENTS

2003/0058118 A1\*   3/2003   Wilson ................ B60C 23/0423
                                                340/679
2005/0109092 A1    5/2005   Martinez Marrufo et al.

OTHER PUBLICATIONS

English Translation of the Written Opinion for International Application No. PCT/FR2017/053648, dated Apr. 10, 2018, 6 pages.

\* cited by examiner

METHOD FOR PAIRING A MEASUREMENT MODULE MOUNTED IN A MOTOR VEHICLE WHEEL

CROSS REFERENCE TO RELATED APPLICATIONS

This application is the U.S. National Phase Application of PCT International Application No. PCT/FR2017/053648, filed Dec. 18, 2017, which claims priority to French Patent Application No. 1663129, filed Dec. 22, 2016, the contents of such applications being incorporated by reference herein.

FIELD OF THE INVENTION

The present invention pertains to the field of motor vehicles and relates more particularly to a method and to a computer for pairing a measurement module with the wheel in which it is installed. The invention aims in particular to propose a fast, reliable and effective method allowing an on-board computer in a motor vehicle to associate a measurement module with the wheel in which it is installed.

BACKGROUND OF THE INVENTION

Nowadays, it is known to install, in each wheel of a motor vehicle, a measurement module for monitoring certain parameters of said wheel. Such a measurement module is commonly called a TPMS for "tire pressure monitoring system" module. Such a measurement module, whose data are transmitted to an on-board computer in the vehicle, makes it possible for example to measure the pressure of the tire as well as its temperature.

As a motor vehicle comprises a plurality of wheels, it is necessary for the computer to identify the measurement module of each wheel in order to allow it to determine the wheel to which the data correspond and thus be able to utilize said data. It is therefore necessary for each measurement module to locate the wheel in which it is installed. Such a location and association method is known to those skilled in the art under the name pairing.

In one existing solution, known under the name "localization with synchronized emissions" (LSE), it is known to use a measurement module comprising an acceleration measurement sensor for each wheel.

When the wheels turn, the measurements performed by the acceleration measurement sensor allow the measurement module to determine the time at which it is in a predetermined position, for example at its maximum height, for which it then sends the computer a coded message in one or more signals.

In order to associate each measurement module with a wheel of the vehicle, it is necessary to associate the signals received from each measurement module with a parameter specific to each wheel. Now, when the vehicle is moving, it is observed that each wheel turns at a rotational speed different from the other wheels, in particular due to the fact that some of the wheels may have different diameters and that they follow different trajectories on bends, as illustrated in FIG. 1.

In this existing solution, the computer uses the wheel anti-lock system of the vehicle, also known under the name ABS for anti-lock braking system, to determine the angular orientation of each wheel.

The ABS system comprises a plurality of wheel anti-lock modules each installed facing each wheel of the vehicle. Each wheel anti-lock module includes a sensor, called WSS ("wheel speed sensor"), delivering a signal representative of the angular orientation of the corresponding wheel to the computer.

For each measurement module, the computer thus correlates, upon each wheel revolution, the time of reception of the signal emitted by the measurement module with the value of the angular orientation of the wheel signal received from each anti-lock module.

In doing so, the computer determines that a measurement module is associated with a wheel when the angular orientation of said wheel is substantially the same each time a signal is emitted by this measurement module (that is to say each time the measurement module is situated in the same angular position). Specifically, with the wheels turning at different speeds, in particular on bends, the result of this is that the signals emitted by a measurement module installed in a given wheel are not synchronized with the angular orientations of the other wheels.

By proceeding in this way, the computer is then able to associate each measurement module with one of the wheels of the vehicle. However, such a solution exhibits the drawback of requiring each wheel to use a measurement module including an acceleration sensor, thereby making the measurement module complex and expensive.

To at least partly overcome this drawback, document U.S. Pat. No. 7,230,525, incorporated herein by reference, discloses a vehicle whose measurement modules do not have an acceleration sensor. In this solution, the pairing of the measurement modules with their respective wheels by the computer is based on the correlation, by the computer, between the power of the signals received from the measurement modules and the angular orientation of each wheel, the signals being emitted periodically, for example every 15 or 20 seconds.

Specifically, during the rotation of a wheel, depending on the angular position of the measurement module, the power of a signal received by the computer will be higher or lower. The closer the measurement module is to the computer and if there is no obstacle between them, the higher this power will thus be. By contrast, if the measurement module is far from the computer or an obstacle is situated between the two of them, the power of the received signal will be lower.

This method requires each measurement module to emit a minimum number of signals allowing the computer to determine a set of points representative of the variations in power of the received signals as a function of the angular orientation of each wheel.

The correlation is established when the set of points representative of the variations in power of the received signals as a function of the angular orientation of each wheel produces, for a given wheel, a repetitive pattern characterizing the synchronization of the angular orientation of said wheel with the power of the signals from the corresponding measurement module.

To establish such a correlation, the method described in document U.S. Pat. No. 7,230,525 proposes periodically measuring the power of the signals until a minimum number of points in the interval of angular orientation of the wheel of between 0° and 360° is obtained, and then establishing a correlation when the standard deviation of the measured power values is lower than a predetermined threshold.

In practice, this method requires receiving a very high number of signals received from each measurement module, typically more than 25, thereby making the method particularly time-consuming. In addition, such a statistical solution of calculating standard deviations requires implementing a complex algorithm that requires significant processing capabilities, thereby making it extremely lengthy and expensive.

SUMMARY OF THE INVENTION

The aim of an aspect of the invention is to at least partly rectify these drawbacks by proposing a simple, reliable, effective and inexpensive solution allowing each measurement module to be paired with the wheel in which it is installed.

To this end, an aspect of the invention first of all relates to a method for pairing a measurement module with a wheel of a motor vehicle comprising a plurality of wheels, said method being implemented by an on-board computer in said vehicle, said measurement module being installed in one of the wheels of the vehicle and being able to emit, to the computer, at least one measured signal taking the form of at least one pulse received by the computer in the form of a frame of varying power, over at least one interval of a power range divided into K consecutive intervals of the same width, as a function of the position of the measurement module with respect to the computer, the vehicle comprising a plurality of wheel anti-lock modules, each wheel anti-lock module, installed facing a wheel, being able to deliver, to the computer, an orientation signal representative of the angular orientation of said wheel, varying over an angular orientation range divided into M consecutive intervals of the same width, which are preferably predetermined.

The pairing method comprises:
for each frame of a measured signal received by the computer, the steps of:
  determining at least one power value of said received measured signal,
  determining, at the time of reception of the measured signal, the angular orientation of each wheel on the basis of the orientation signal received from each wheel anti-lock module,
  for each determined power value, identifying, in a plurality of predetermined tables, each divided into K rows and M columns respectively associating the power of the measured signal with the angular orientation of each of the wheels, at least one row and column pair per table, each row and column pair respectively comprising said determined power value and the value of the angular orientation determined for each of the wheels,
a final step of pairing the measurement module with one of the wheels of the vehicle when, after the number of columns determined for each table has reached a first minimum threshold, the number of row and column pairs identified in one of the tables for one of the wheels is lower than a maximum threshold and the number of row and column pairs identified in each of the other tables for the other wheels is higher than a second minimum threshold.

The method according to an aspect of the invention allows the on-board computer in the vehicle to easily and quickly pair each measurement module with each of the wheels of the vehicle. As the method is based on statistical observations, it specifically makes it possible to perform a correlation very quickly between each measurement module and the wheel in which it is installed. In addition, the method according to an aspect of the invention may be used with measurement modules without an acceleration sensor, which are less expensive than measurement modules including such a sensor.

Advantageously, the duration of the measured signal is less than 500 ms, preferably less than 300 ms, so as to limit the risk of collisions between measured signals coming from various measurement modules.

Advantageously, the emitted measured signal takes the form of a pulse train, comprising for example between three and twelve pulses. Using pulses allows the computer to measure the power of a measured signal that it receives at least once per frame, for example three times.

Preferably, the first minimum threshold for the number of columns determined for each table is higher than 20% and lower than 40%, preferably of the order of 30%, so as to ensure coverage of close to a third of the angular orientations of each wheel, while at the same time reducing the risk of collisions between the measured signals emitted by various measurement modules.

Advantageously, the maximum threshold for the number of pairs determined for a table is less than or equal to 40%, preferably of the order of 30%, so as to allow fast pairing, and also making it possible to extend the lifetime of a measurement module, this value of the maximum threshold having been established empirically in simulations.

Advantageously, the second minimum threshold for the number of pairs determined for the other tables is higher than or equal to 70%, preferably of the order of 90%, so as to effectively confirm pairing with a wheel.

Preferably, pairing may be performed for a given measurement module when, after the number of columns of each table has reached the first minimum threshold, the number of row and column pairs identified in one of the tables is lower than the maximum threshold and the number of row and column pairs identified for each of the other tables is higher than the second minimum threshold and contained within one and the same interval of predetermined width, for example 5%, of the total number of row and column pairs of the table. Such proximity between the numbers of row and column pairs identified for the other tables advantageously makes it possible to increase the first minimum threshold (for example from 30% to 40%) while at the same time lowering the maximum threshold (for example from 90% to 70%).

Advantageously, the pairing method comprises a preliminary step of evaluating the power range of the measured signal emitted by the measurement module and of determining the width of the K intervals so as to adjust the width of the K intervals and thus improve the accuracy of the pairing.

An aspect of the invention also relates to a computer for a motor vehicle, said vehicle comprising a plurality of wheels, each wheel comprising a measurement module, each measurement module being able to emit, to said computer, at least one measured signal taking the form of at least one pulse received by the computer in the form of a frame of varying power, over at least one interval of a power range divided into K consecutive intervals of the same width, as a function of the position of the measurement module with respect to the computer, the vehicle comprising a plurality of wheel anti-lock modules, each wheel anti-lock module, installed facing a wheel, being able to deliver, to the computer, an orientation signal representative of the angular orientation of said wheel, varying over an angular orientation range divided into M consecutive intervals of the same width, said computer being configured, for each measurement module, so as to:
for each frame of a received measured signal:
  determine at least one value of the power of said received measured signal, determine, at the time of reception of the measured signal, the angular orientation of each wheel on the basis of the orientation signal received from each wheel anti-lock module, for each determined power value, identify, in a plurality of predetermined tables, each divided into K rows and M columns respectively associating the power of the measured signal as a function of the angular orientation of each of the wheels, one row and column pair per table, each row and column pair respectively comprising said determined power value and the value of the angular orientation determined for each of the wheels, detect that the number of columns determined for each table has reached a first minimum threshold, detect that the number of row and column pairs identified in one of the tables is lower than a maximum threshold and that the number of row and column pairs identified in the other tables is higher than a second minimum threshold, pair the measurement module with one of the wheels when, after the number of columns determined for each table has reached the first minimum threshold, the number of row and column pairs identified in one of the tables for one of the wheels is lower than the maximum threshold and the number of row and column pairs identified in each of the other tables for the other wheels is higher than the second minimum threshold.

Advantageously, the computer is configured so as to perform pairing when, when more than 30% of the columns of each table have been determined, the number of row and column pairs identified in a table is less than 30% of the total number of row and column pairs of the table and the number of row and column pairs identified in each of the other tables is higher than 90% of the total number of row and column pairs of each of the tables, allowing fast pairing, and also making it possible to extend the lifetime of a measurement module, these values having been established empirically in simulations.

Advantageously again, the computer is configured so as to evaluate beforehand the power range of the measured signal emitted by the measurement module and determine the width of the K intervals, making it possible to perform pairing in a table divided into a plurality of intervals of the same width representative of the used power range.

An aspect of the invention relates lastly to a motor vehicle comprising a computer such as presented above, a plurality of wheels, each wheel preferably comprising a measurement module, each measurement module being able to emit, to said computer, for example periodically, at least one measured signal taking the form of at least one pulse received by the computer in the form of a frame of varying power, over at least one interval of a power range divided into K consecutive intervals of the same width, as a function of the position of the measurement module with respect to the computer, and a plurality of wheel anti-lock modules, each wheel anti-lock module, installed facing a wheel, being able to deliver, to the computer, an orientation signal representative of the angular orientation of said wheel, varying over an angular orientation range divided into M consecutive intervals of the same width.

Advantageously, the duration of the measured signal emitted by each measurement module is less than 500 ms, preferably less than 300 ms, so as to limit the risk of collision between measured signals coming from various measurement modules.

BRIEF DESCRIPTION OF THE DRAWINGS

Other features and advantages of aspects of the invention will emerge during the following description, given with reference to the appended figures, which are given by way of nonlimiting example and in which identical references are given to similar objects.

FIGS. 4A and 4B schematically show the communication links allowing a measurement module to send its signal to the computer of the motor vehicle as a function of the position of the measurement module in a wheel.

DETAILED DESCRIPTION OF THE PREFERRED EMBODIMENTS

The pairing method according to an aspect of the invention is presented primarily for the purpose of implementation in a motor vehicle. However, any implementation in a different context, in particular in any type of vehicle comprising a plurality of wheels and a plurality of measurement modules that need to be paired (that is to say associated) is also targeted by an aspect of the invention.

Figure 2:
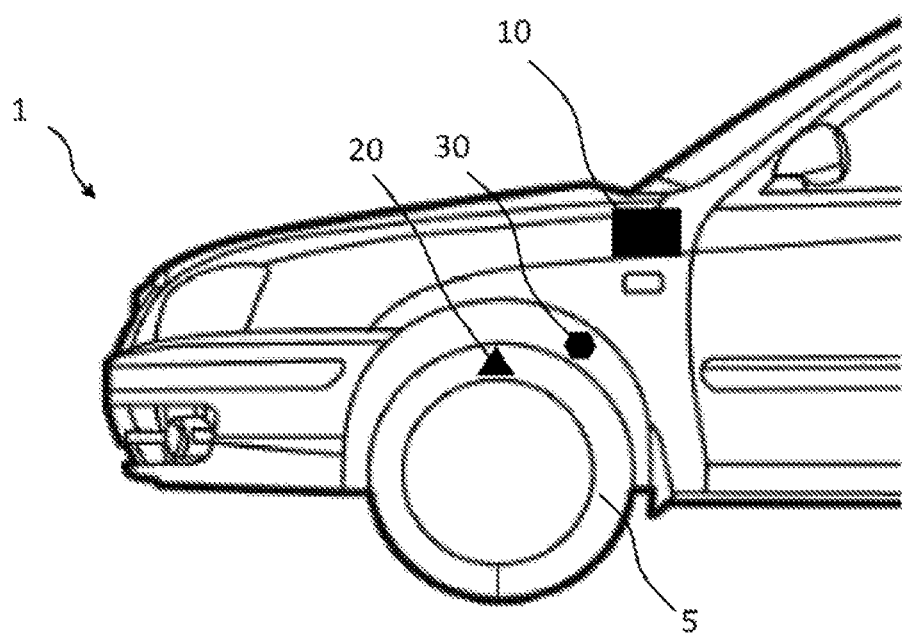
FIG. 2 schematically shows an example of positioning of a measurement module and of a motor vehicle wheel anti-lock module with respect to a computer, on board said vehicle (partially shown), allowing said measurement module to be paired with said wheel.

With reference to FIG. 2, a motor vehicle 1 comprises an on-board computer 10, a plurality of wheels 5 (only one of which is shown in this partial view), each comprising a measurement module 20 able to measure the characteristics of the wheel 5, and a plurality of anti-lock modules 30, each of the anti-lock modules 30 being installed facing a wheel 5. It will be noted that an aspect of the invention may also be implemented if some of the wheels 5 do not include a measurement module 20, on the condition that at least two wheels 5 include one so as to be able to make a pairing choice.

Figure 3:
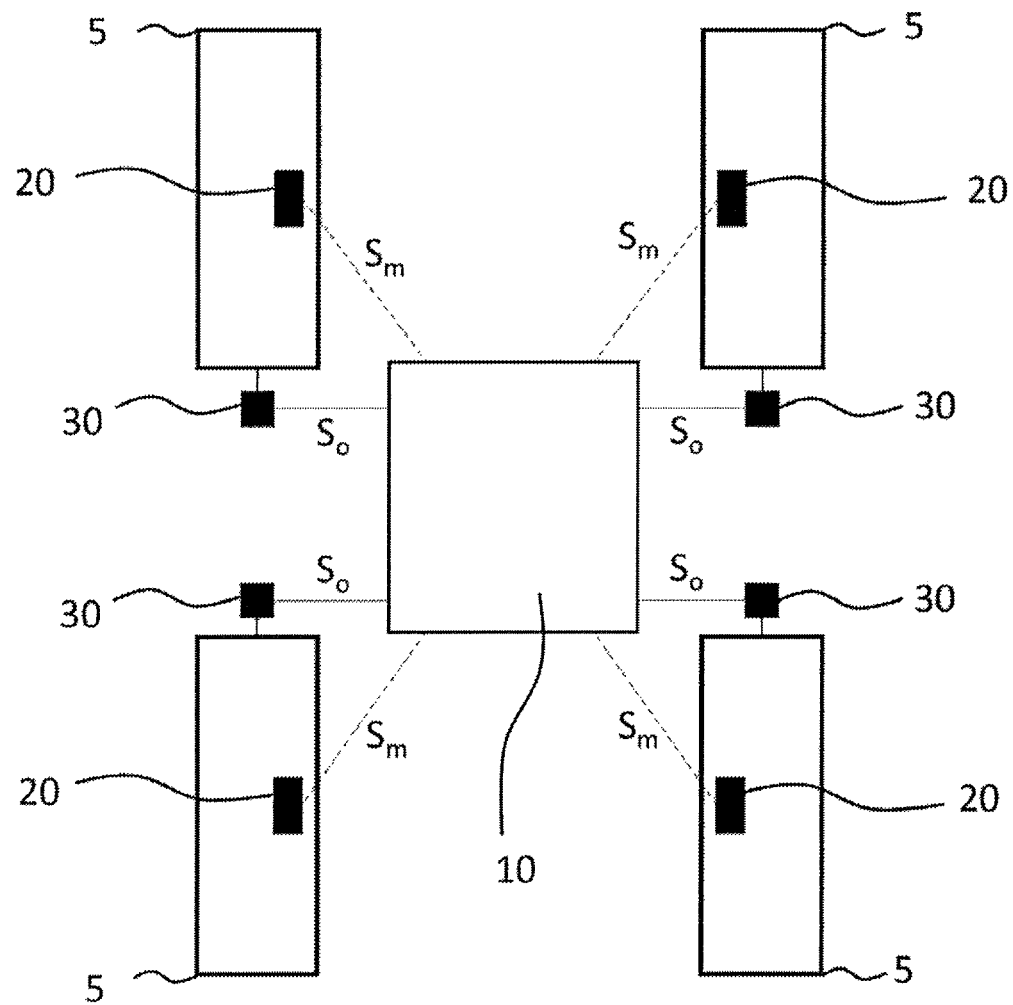
FIG. 3 schematically shows the communication links allowing four measurement modules and four anti-lock modules to send their respective signals to the computer of the motor vehicle.

In this example, with reference to FIG. 3, the motor vehicle 1 comprises four wheels 5. Such a vehicle 1 thus comprises four measurement modules 20 and four anti-lock modules 30.

The measurement module 20 is configured so as to periodically emit, for example every 10 to 30 seconds (for example every 16 seconds), a measured signal $S_m$, in which there is coded a message containing characteristics of the wheel 5, such as for example its pressure or its temperature. Such a measured signal $S_m$ also comprises an identifier for distinguishing the measured signal $S_m$ emitted by each measurement module 20.

The emitted measured signal $S_m$ preferably takes the form of a pulse train (or "burst"), comprising for example between three and twelve pulses, making it possible to fragment the coded message between said pulses. This pulse train may for example take the form, as is known, of a series of segments. By way of example, a pulse train may comprise nine pulses, each having a duration of 3 ms and spaced apart from one another by 30 ms (that is to say a total duration of 267 ms).

The computer 10 receives a pulse train emitted by a measurement module 20 in the form of frames, each received frame corresponding to an emitted pulse.

Using, upon emission, a pulse train in which the message is fragmented allows the computer 10, upon reception, firstly to distinguish the measured signals $S_m$ from other signals that are emitted continuously and secondly to measure the power P of each measured signal $S_m$ received over a longer time interval than if the measurement module 20 were to send a non-fragmented message (that is to say a single pulse) in the measured signal $S_m$, thus making it possible to measure a more significant variation in power P during the duration of said time interval.

Furthermore, the computer 10 measures at least one power P value per frame, but is advantageously able to measure several of them per frame through sampling, for example at least three.

The duration of a measured signal $S_m$ may be intentionally limited, for example below 500 ms, preferably below 300 ms, so as to greatly reduce the risks of collision between the measured signals $S_m$ emitted by the various measurement modules 20 of the vehicle 1.

To limit the duration of an emitted pulse train and therefore of a train of received frames, it is possible for example to reduce the number of pulses, the duration of the pulses and/or the time interval between two pulses.

Figure 5:
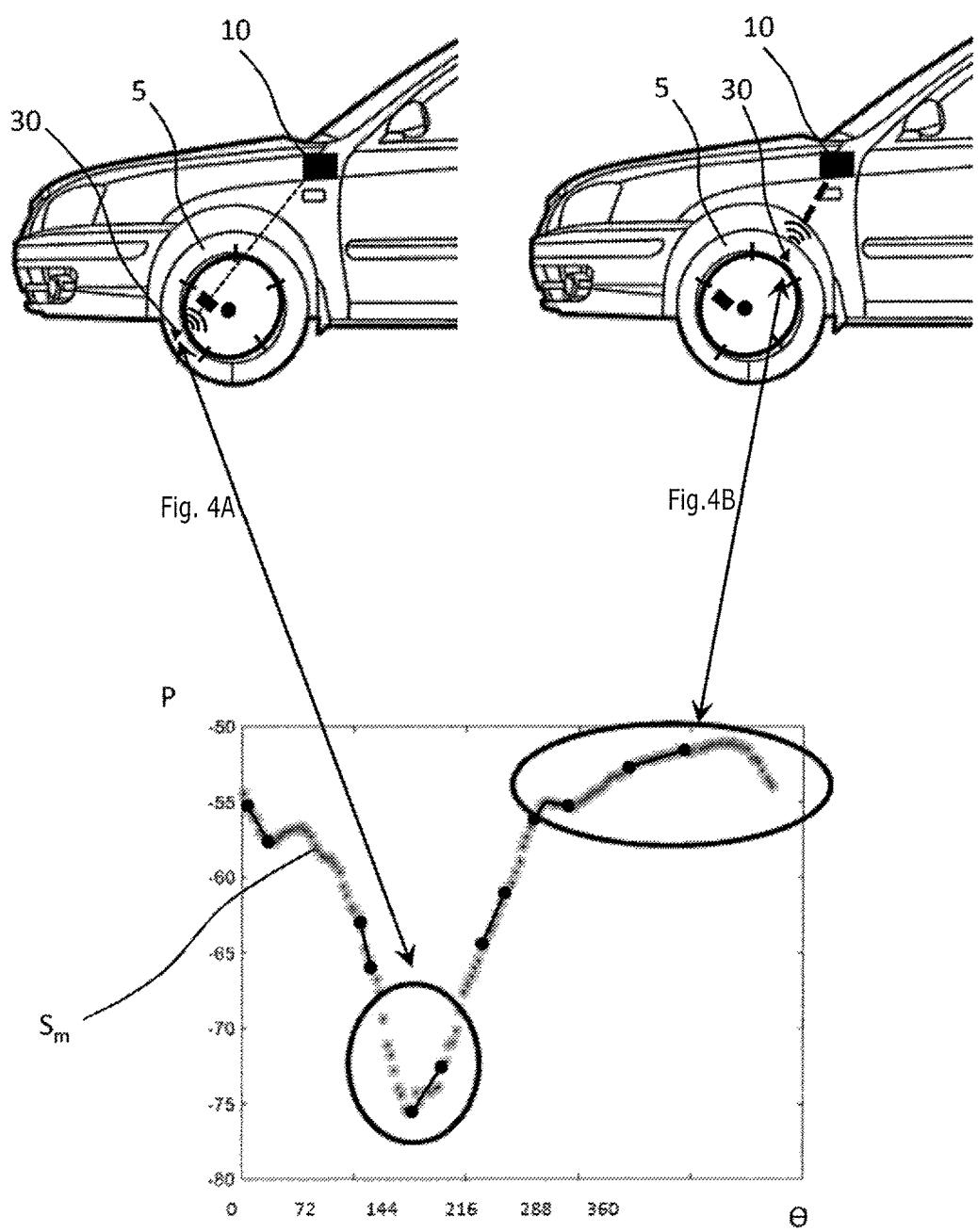
FIG. 5 illustrates a graph of the evolution of the power of the signal, emitted by a measurement module installed in a wheel, received by the computer during one complete revolution of the wheel.

With reference to FIGS. 4A, 4B and 5, when the vehicle 1 is moving and the wheels 5 are turning, the measured signal $S_m$, emitted by the measurement module 20 of each wheel 5 in the form of a pulse train, is received by the computer 10 with a variable power P as a function of the position of the measurement module 20 with respect to the computer 10. Specifically, during one revolution of the wheel 5, the measurement module 20 installed in said wheel 5 may be situated at a position closer to or further away from the computer 10, and may even be masked by another apparatus of the vehicle 1, attenuating the signal.

Figure 1:
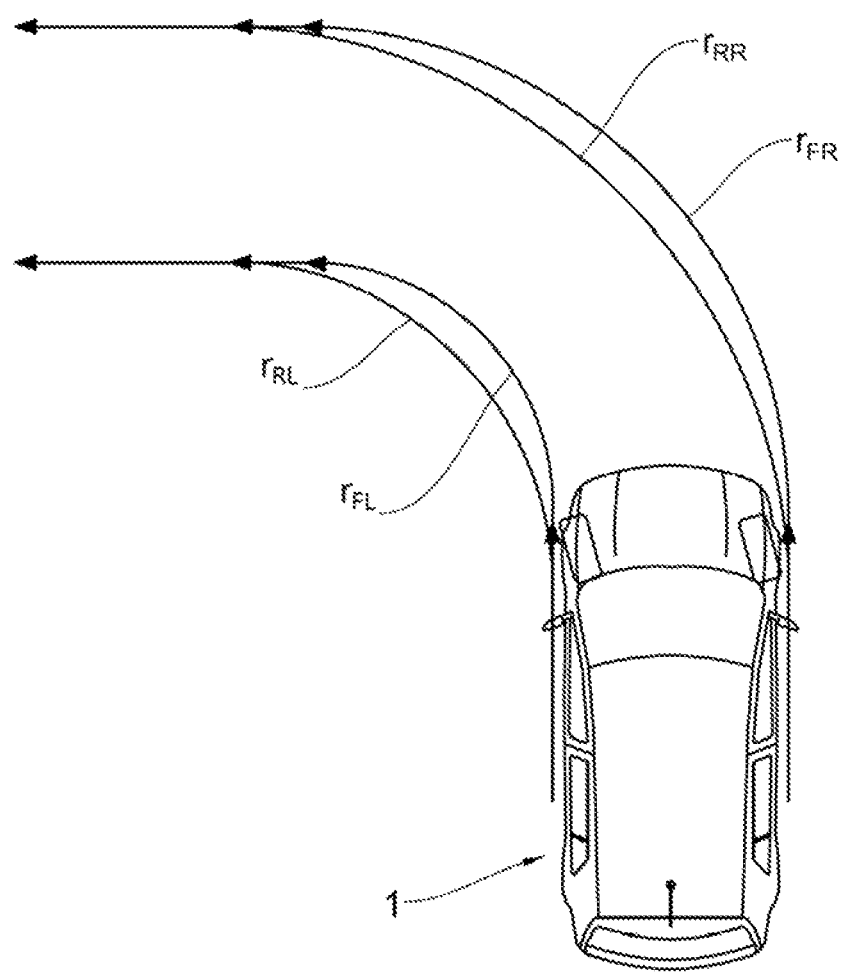
FIG. 1 schematically illustrates an example of a trajectory of the wheels of a motor vehicle on a bend.

Furthermore, the anti-lock module 30 delivers, for each wheel 5, a continuous signal to the computer 10, denoted orientation signal $S_o$. Such an orientation signal $S_o$ indicates the angular orientation Θ (between 0° and 360°) of the wheel 5 facing which the anti-lock module 30 is installed. Specifically, when the vehicle 1 is moving, each wheel 5 turns at a speed different from the other wheels 5, as described above and illustrated in FIG. 1. Each anti-lock module 30 thus makes it possible, at any time, to ascertain the angular orientation Θ of each wheel 5.

The computer 10 is therefore able, at a given time, to measure both the received power P of the measured signal $S_m$ emitted by each measurement module 20 and the angular orientation Θ of each wheel 5 facing each anti-lock module 30.

Preferably, with the measurement module 20 emitting a measured signal $S_m$ for a predetermined time interval, the computer 10 is configured so as to measure the power P of the received measured signal $S_m$ and determine, on the basis of each orientation signal $S_o$ received from each wheel 5, the angular orientation Θ value of each of the wheels 5 corresponding to the measured power P.

In other words, the computer 10 is able, for each measurement module 20, to determine a plurality of received measured signal $S_m$ power P measurements associated with a plurality of angular orientation Θ measurements from the four anti-lock modules 30.

The computer 10 is also configured so as to correlate the power P of the measured signal $S_m$ received from each measurement module 20 as a function of the angular orientation Θ of each of the wheels 5 for a plurality of positions of each wheel 5, that is to say for a plurality of angular orientations Θ of each of the wheels 5, typically obtained for a plurality of wheel 5 revolutions, so as to associate each wheel 5 with a measurement module 20, as will be explained hereinafter.

An aspect of the invention will now be described in terms of the implementation thereof with reference to FIGS. 6 to 12.

Figure 6:
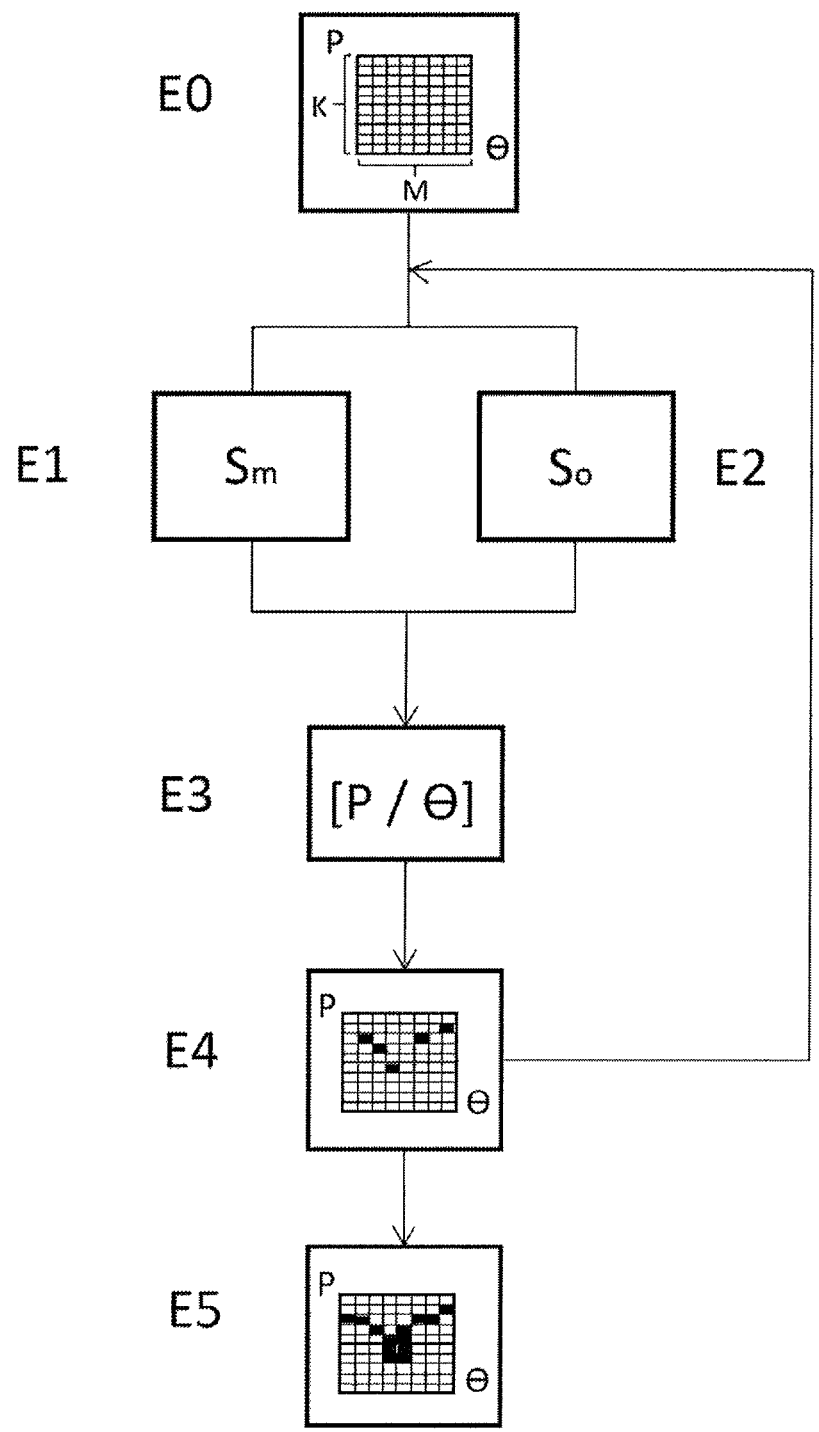
FIG. 6 schematically shows the steps of a pairing method according to one embodiment of an aspect of the invention.
Figure 7:
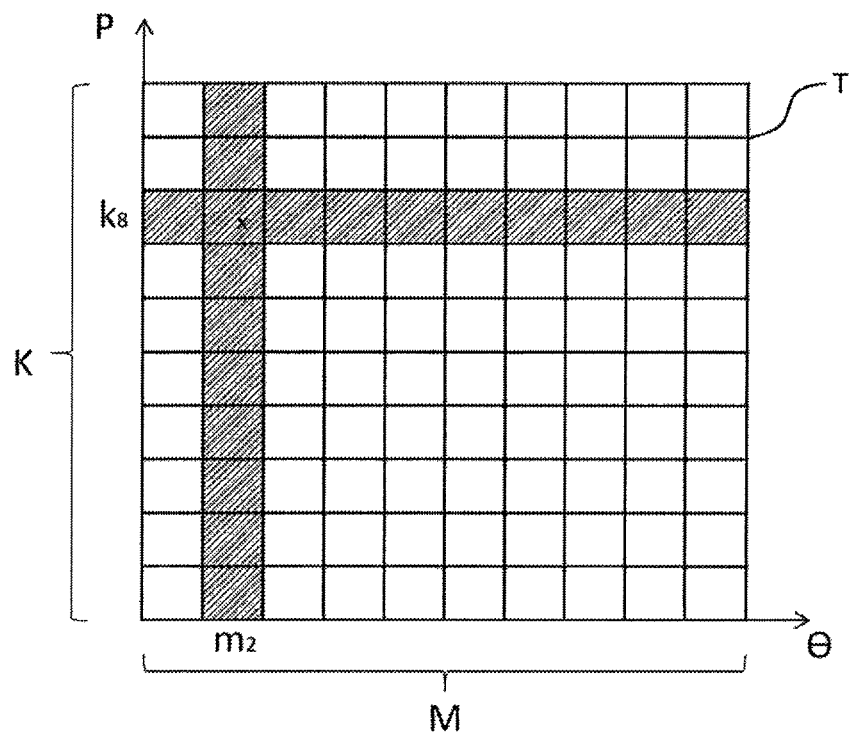
FIG. 7 schematically illustrates a table for associating the power of a signal received by the computer from a measurement module and the angular orientation of a wheel.
Figure 8:
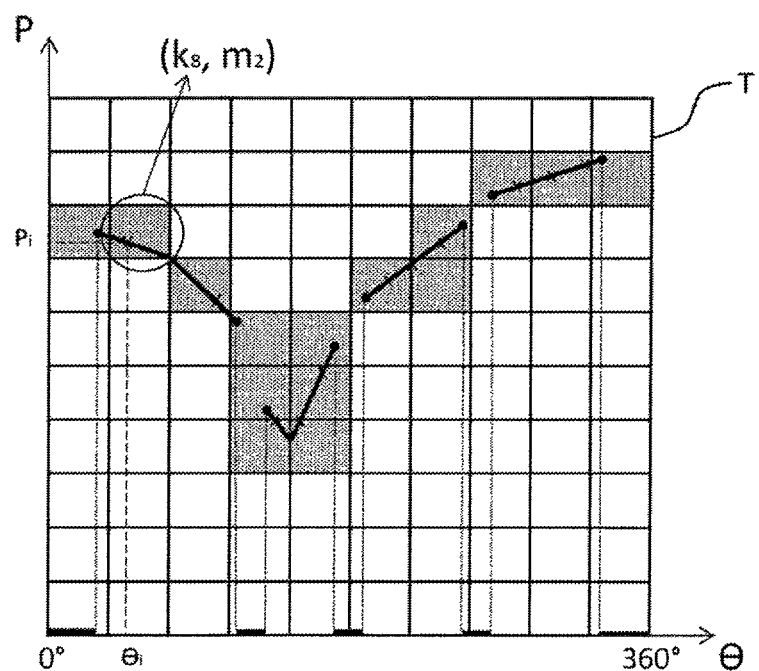
FIG. 8 schematically shows a set of pairs comprising a power value of the signal, emitted by the measurement module and received by the computer, associated with an angular orientation emitted by the anti-lock module.

First of all, with reference to FIGS. 6 to 8, the computer 10 determines, in a preliminary step E0, a plurality of tables T, each table T associating the power P of the measured signal $S_m$ received by the computer 10 as a function of the angular orientation Θ of each wheel 5.

With reference to FIG. 7, a table T, in relation to a wheel 5, comprises a set of K rows and M columns corresponding respectively to a predetermined number K of intervals representative of the power P range of the measured signal $S_m$ received by the computer 10, and to a predetermined number M of intervals representative of the angular orientation Θ range of the wheel 5.

The angular orientation Θ range of the wheels 5 may be expressed in degrees and be contained within the interval [0; 360], or else be expressed as a number of teeth of a disk mounted on each wheel 5 measured by the anti-lock module 30 in a manner known per se.

To determine the power P range of the measured signal $S_m$ received from the measurement modules 20, the computer 10 may for example determine beforehand, in an initialization phase (that is to say before proceeding with pairing), the maximum power P and the minimum power P of the measured signals $S_m$ received during one or more wheel 5 revolutions. As a variant, the table T may be defined in advance and stored in a memory zone of the computer 10.

Preferably and by way of example, such a table T comprises between eight and twenty-four rows, preferably sixteen rows, and between eight and thirty-two columns, preferably sixteen columns.

This table T makes it possible to classify a power P of a received measured signal $S_m$ and angular orientation Θ pair (P, Θ) of a wheel 5 in a cell of the table T by associating it with a row and column pair (k, m) of the table T.

To associate each measurement module 20 with the wheel 5 in which it is installed, the computer 10 will carry out, preferably simultaneously, for at least three measurement modules 20, a series of four successive steps E1 to E4 that will be repeated several times for each measurement module 20 with each of the wheels 5.

For the sake of clarity, the method will be described hereinafter in steps E1 to E4 thereof for a given measurement module 20.

First of all, the computer 10 receives, in a step E1, in the form of a train of frames, a measured signal $S_m$ emitted by the measurement module 20 in the form of a pulse train.

In parallel, in a step E2, the computer 10 receives the orientation signal $S_o$ representing the angular orientation $\Theta$, sent by each anti-lock module 30 of each wheel 5 of the vehicle 1.

In a step E3, the computer 10 determines the power P of the measured signal $S_m$ during the time interval over which it is received and correlates it, for each wheel 5 of the vehicle 1, with the angular orientation $\Theta$ given by the orientation signal $S_o$ received in step E2.

Preferably, each frame of the received measured signal $S_m$ is sampled by the computer 10, which then associates the value of the power P of each sample (for example three samples per frame) with an angular orientation $\Theta$ value for each wheel 5, thus forming power P and angular orientation $\Theta$ value pairs (P, $\Theta$) for each of the wheels 5.

In a step E4, the computer 10 then identifies, in each table T of a plurality of tables T (a table T corresponding to one of the four wheels 5), a row and column pair (k, m) for each power P and angular orientation $\Theta$ pair (P, $\Theta$) determined in step E3.

Steps E1 to E4 are repeated upon each emission of a measured signal $S_m$ by the measurement module 20 so as to be able to evaluate the power P of the measured signal $S_m$ over a significant portion of the angular orientation $\Theta$ range and thus determine a large number of power P and angular orientation $\Theta$ pairs (P, $\Theta$) for each wheel 5.

The power P of the measured signal $S_m$ is preferably evaluated over at least 30% of each angular orientation $\Theta$ range of each wheel 5 (that is to say over 30% of the columns of each table T), this value statistically making it possible to associate enough power P and angular orientation $\Theta$ value pairs (P, $\Theta$) of each table T to allow the measurement module 20 to be paired with a wheel 5.

In the illustrative (but nonlimiting) example of FIG. 8, showing a table T in relation to a wheel 5, the measurement module 20 emits a measured signal $S_m$, in the form of a train of four pulses received by the computer 10 in the form of four frames, for each of which the computer 10 performs five power P measurements. For each measurement, the computer 10 determines at least one power P value and the angular orientation $\Theta$ of the corresponding wheel 5, and identifies the row and column pair (k, m) to which these measurements correspond. In this example, in which four frames are received, twenty row and column pairs (k, m) are thus determined (that is to say twenty power P measurements).

Steps E1 to E4 are repeated several times until the computer 10 determines, in a step E5, that a decision criterion is met so as to associate a given measurement module 20 with a given wheel 5.

Preferably, this decision criterion is a minimum number of angular orientations $\Theta$ of each wheel 5 covered over the range of each table T, as described above.

In practice, the computer 10 will determine that a measurement module 20 is installed in a given wheel 5 when, after the number of columns of each table T has reached a first minimum threshold, for example 30% of the total number of columns of each table T, the number of row and column pairs (k, m) identified in a table T for said wheel 5 is lower than a maximum threshold, for example between 30% and 50%, preferably 30%, that is to say seventy-six to one hundred and twenty-eight pairs (k, m) for a table T of sixteen rows by sixteen columns, and the number of row and column pairs (k, m) identified in the other tables T for the other wheels 5 is lower than a second minimum threshold, for example 90% of all of the row and column pairs (k, m) of each table T.

As a variant, the computer 10 may also determine that a measurement module 20 is not installed in a given wheel 5 when, after the determined number of columns of each table T has reached the first minimum threshold, the number of row and column pairs (k, m) identified for said wheel 5 is higher than the second minimum threshold, or even higher than 70%, for example higher than 90%, and the number of row and column pairs (k, m) identified for another wheel 5 is lower than the maximum threshold.

Pairing may also be performed for a given measurement module 20 when, after the number of columns of each table T has reached the first minimum threshold, the number of row and column pairs (k, m) identified in one of the tables T is lower than the maximum threshold and the number of row and column pairs (k, m) identified for each of the other tables T is higher than the second minimum threshold and contained within one and the same interval of predetermined width, for example 5%, of the total number of row and column pairs (k, m) of the table T. Such proximity between the numbers of row and column pairs (k, m) identified for the other tables T advantageously makes it possible to increase the first minimum threshold (for example from 30% to 40%) while at the same time lowering the maximum threshold (for example from 90% to 70%).

Figure 9:
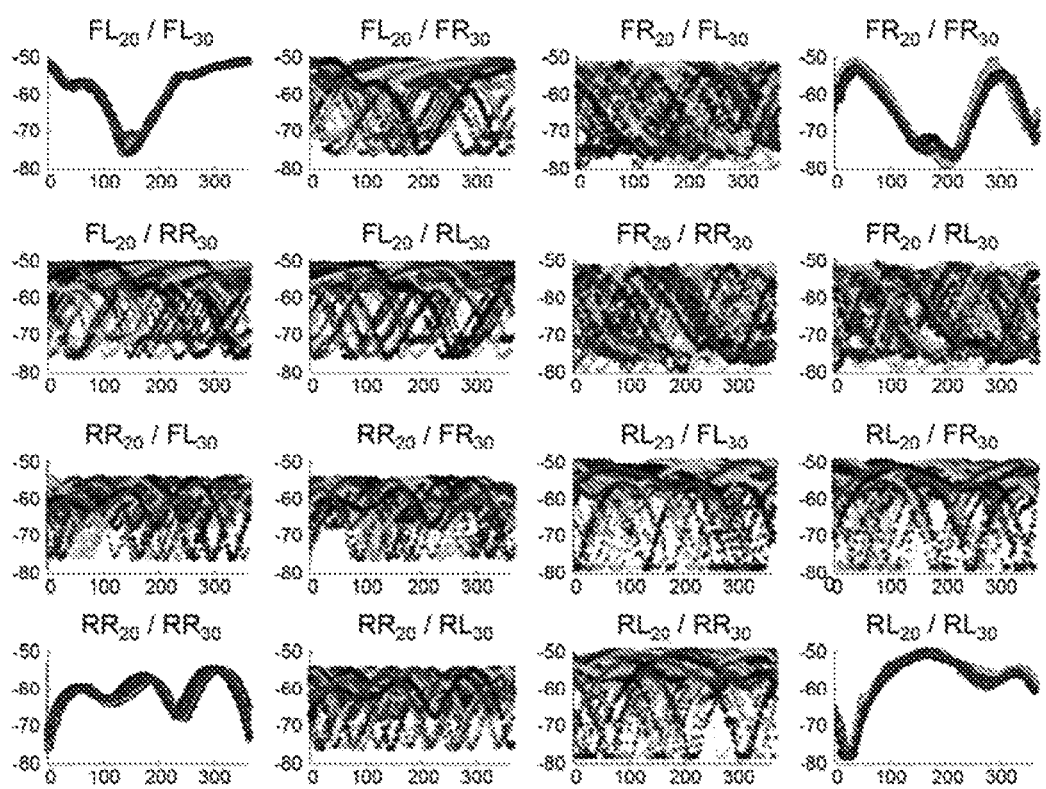
FIG. 9 illustrates a graph of the sixteen possible combinations during pairing of four measurement modules with four wheels determined by their angular orientation from four anti-lock modules.

FIG. 9 shows a plurality of graphs each showing the evolution of the power P of the measured signal $S_m$ received from a measurement module 20 by the computer 10 as a function of the angular orientation $\Theta$ of a wheel 5, for each measurement module 20 and for each wheel 5 (this therefore results in sixteen possible combinations).

Each graph illustrates the evolution of the power P of the measured signal $S_m$ received by the computer 10 as a function of the angular orientation $\Theta$ of a given wheel 5 for a plurality of measured signals $S_m$ sent over the course of several wheel 5 revolutions.

In this example, the four wheels 5 are denoted as follows:
FL, meaning front left,
FR, meaning front right,
RL, meaning rear left,
RR, meaning rear right.

The power P of the measured signals $S_m$ received by the computer 10 and emitted by each of the measurement modules 20 ($FL_{20}$, $FR_{20}$, $RL_{20}$ and $RR_{20}$) are described as a function of the angular orientations $\Theta$ given by each anti-lock module 30 ($FL_{30}$, $FR_{30}$, $RL_{30}$ and $RR_{30}$).

It is thus deduced that a measurement module 20 is associated with the wheel 5 in which it is installed when the evolution of the power P of the received measured signals $S_m$ as a function of the angular orientation $\Theta$ is substantially identical over the course of the received measured signals $S_m$ (cases $FL_{20}/FL_{30}$, $FR_{20}/FR_{30}$, $RR_2/RR_{30}$ and $RL_{20}/RL_{30}$ in FIG. 9), that is to say that the graphs are substantially superimposed over the course of the measured signals $S_m$.

Likewise, it is deduced that a measurement module 20 is not associated with a wheel 5 when the evolution of the power P of the received signals as a function of the angular orientation Θ differs over the course of the received measured signals $S_m$, that is to say that the graphs are not superimposed over the course of the measured signals $S_m$ (all of the other cases in FIG. 9).

In this example, the computer 10 determines the number of pairs (k, m) identified over sixteen tables T (four tables T per measurement module 20).

Figure 10:
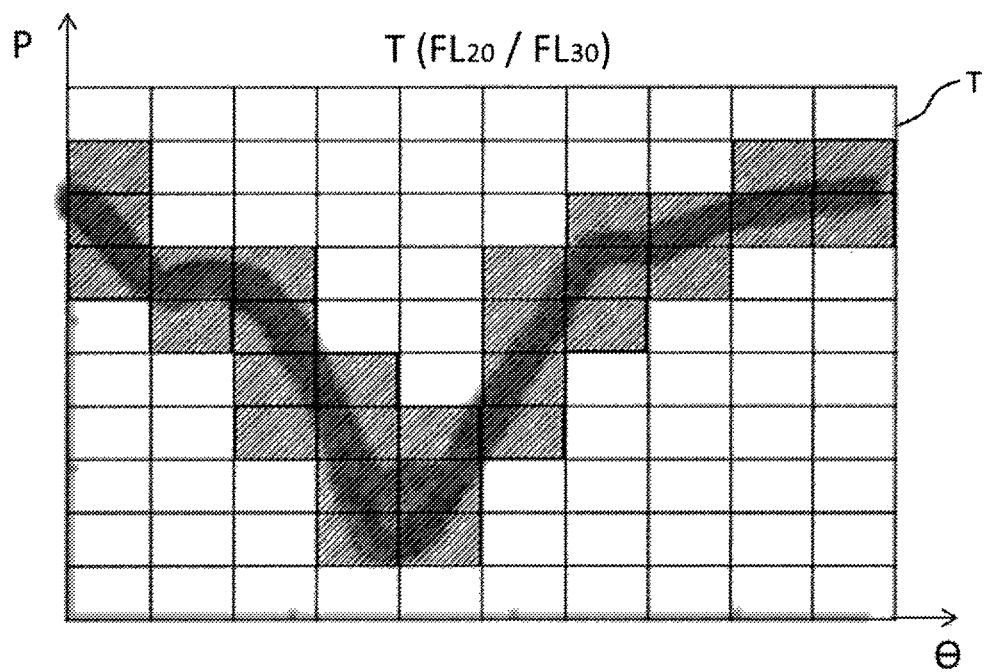
FIG. 10 illustrates a number of determined pairs indicating pairing between a measurement module and the wheel in which it is installed.

FIG. 10 shows a first example of a table T for a given measurement module 20, on which there is superimposed a plurality of graphs of power P as a function of the angular orientation Θ of the wheel 5 in which said measurement module 20 is installed, for a plurality of measured signals $S_m$.

This table T includes ten rows and ten columns corresponding respectively to a number of ten intervals representative of the power P range of the measured signal $S_m$ received by the computer 10, and to a number of ten intervals representative of the angular orientation Θ range of the wheel 5.

In this example, the table T ($FL_{20}/FL_{30}$) comprises, after a plurality of measured signals $S_m$, sent after a plurality of wheel 5 revolutions, covering a plurality of angular orientations Θ, twenty-nine determined pairs (k, m) out of a hundred possible pairs (k, m).

Figure 11:
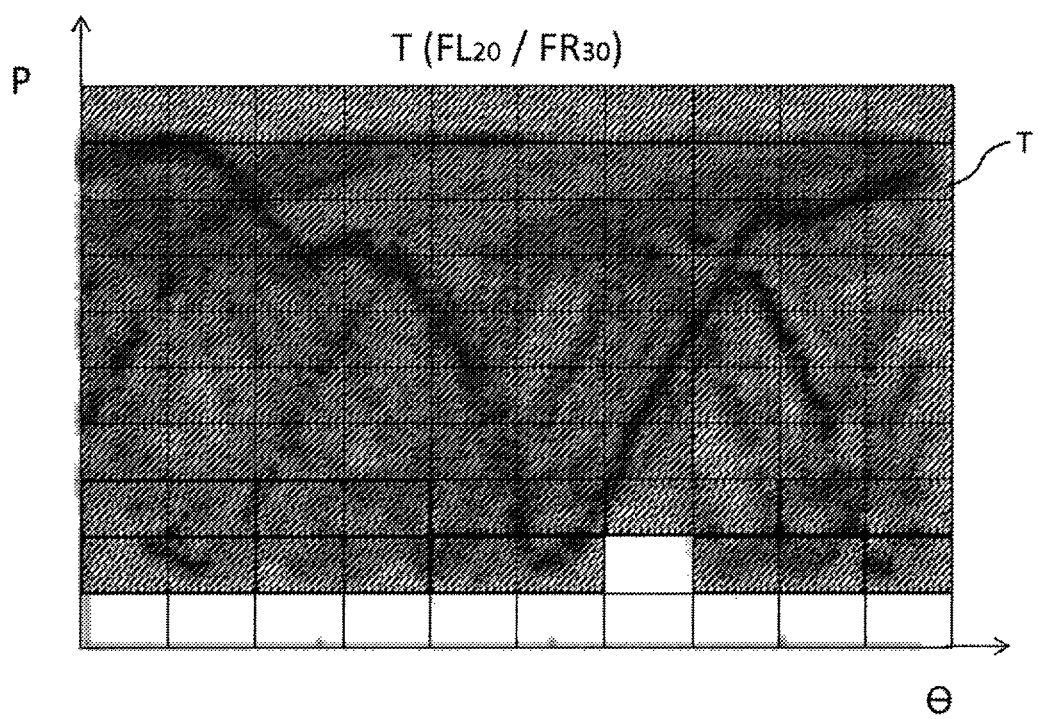
FIG. 11 illustrates a number of determined pairs indicating a lack of pairing between a measurement module and a wheel in which it is not installed.

FIG. 11 shows a second example of a table T for a given measurement module 20, on which there is superimposed a plurality of graphs of power P as a function of the angular orientation Θ of a wheel 5 in which said measurement module 20 is not installed, for a plurality of measured signals $S_m$.

In this example illustrating the power P of the measured signal $S_m$ received by the computer 10 and emitted by the measurement module 20 of the front-left $FL_{20}$ wheel 5, plotted as a function of the angular orientation Θ of the front-right $FR_{30}$ wheel 5, it is noted that the power P graphs obtained for several measured signals $S_m$ are not superimposed. The computer 10 therefore deduces from this, by combining these results with the results of the other wheels 5, that the measurement module 20 of the front-left $FL_{20}$ wheel 5 is not associated with the front-right $FR_{30}$ wheel 5.

Figure 12:
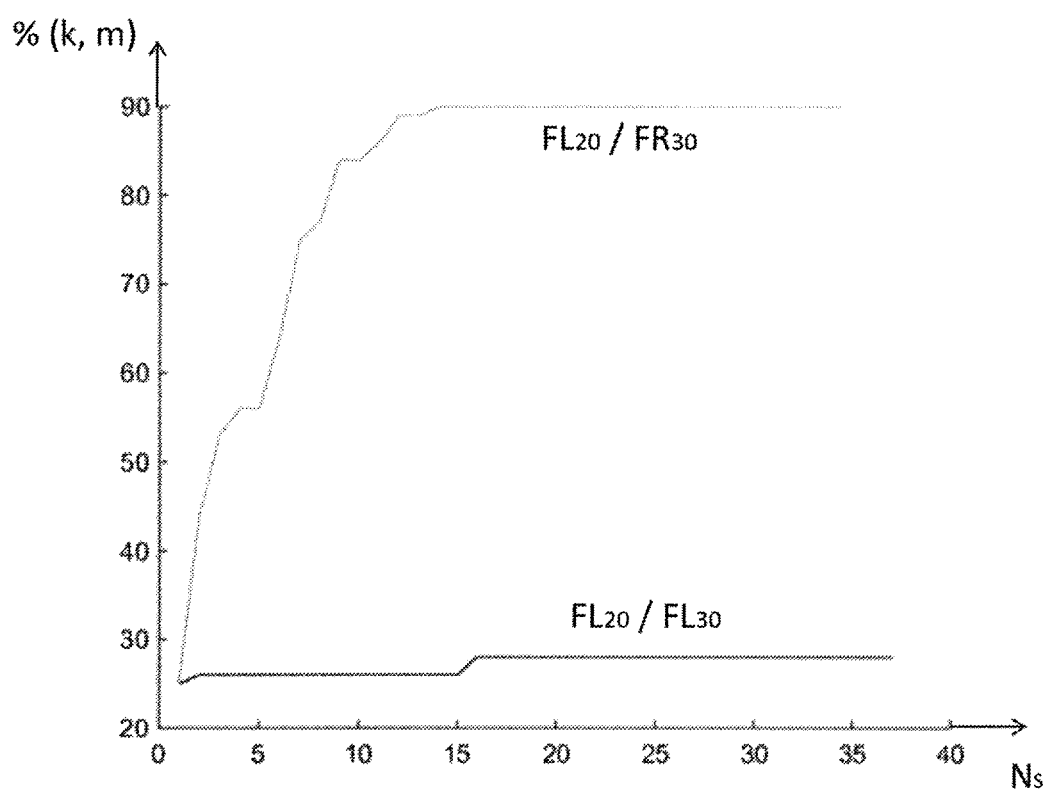
FIG. 12 illustrates a graph of the evolution of the percentage of pairs (k, m) determined as a function of the number of measured signals received according to whether or not a measurement module is installed in a wheel.

FIG. 12 shows, for the measurement module 20 of the front-left $FL_{20}$ wheel 5 and the angular orientations Θ of the front-left $FL_{30}$ and front right $FR_{30}$ wheels 5, the evolution of the percentage of the number of row and column pairs (k, m) as a function of the number $N_s$ of received measured signals $S_m$.

In this example, it is observed that the percentage of pairs (k, m) determined for the front-right $FR_{30}$ wheel 5 increases very quickly above 30% for more than two received measured signals $S_m$ and tends toward a limit close to 90% for more than fifteen received measured signals $S_m$, whereas the percentage of pairs (k, m) determined for the front-left $FL_{30}$ wheel 5 never exceeds 30% regardless of the number $N_s$ of received measured signals $S_m$.

The method has been described for a vehicle 1 comprising four wheels 5, but it goes without saying that the vehicle 1 could equally comprise more or fewer wheels 5. Likewise, the example describes a table T comprising a set of ten rows and ten columns corresponding respectively to a number K of ten intervals representative of the power P range of the measured signal $S_m$ received by the computer 10, and to a number M of ten intervals representative of the angular orientation Θ range of the wheel 5. However, it goes without saying that the table T could comprise a different number K of intervals representative of the power P range of the measured signal $S_m$ received by the computer 10, and a different number M of intervals representative of the angular orientation Θ range of the wheel 5.

The method according to an aspect of the invention is therefore able to converge very quickly and advantageously requires only little processing capability of the computer 10, such that the measurement modules 20 are able to be paired with their respective wheels 5 quickly and efficiently. In addition, the method described in this document does not require the presence of an acceleration sensor in the measurement module 20 of each wheel 5, thereby making the architecture of the computer 10 less complex and limiting costs.

The invention claimed is:

1. A method for pairing a measurement module with a wheel of a motor vehicle comprising a plurality of wheels, said method being implemented by an on-board computer in said vehicle, said measurement module being installed in one of the wheels of the vehicle and being able to emit, to the computer, at least one measured signal taking the form of at least one pulse received by the computer in the form of a frame of varying power, over at least one interval of a power range divided into K consecutive intervals of the same width, as a function of the position of the measurement module with respect to the computer, the vehicle comprising a plurality of wheel anti-lock modules, each wheel anti-lock module, installed facing a wheel, being able to deliver, to the computer, an orientation signal representative of an angular orientation of said wheel, varying over the angular orientation range divided into M consecutive intervals of the same width, said pairing method comprising:

for each frame of a measured signal received by the computer, the computer:
 determining at least one value of the power of said received measured signal,
 determining, at the time of reception of the measured signal, the angular orientation of each wheel on the basis of the orientation signal received from each wheel anti-lock module,
 for each determined power value, identifying, in a plurality of predetermined tables, each divided into K rows and M columns respectively associating the power of the measured signal with the angular orientation of each of the wheels, at least one row and column pair per table, each row and column pair respectively comprising said determined power value and the value of the angular orientation determined for each of the wheels,
a final step of pairing the measurement module with one of the wheels of the vehicle when, after the number of columns determined for each table has reached a first minimum threshold, the number of row and column pairs identified in one of the tables for one of the wheels is lower than a maximum threshold and the number of row and column pairs identified in each of the other tables for the other wheels is higher than a second minimum threshold.

2. The pairing method as claimed in claim 1, wherein the duration of the measured signal is less than 500 ms.

3. The pairing method as claimed in claim 2, wherein the emitted measured signal takes the form of a pulse train.

4. The pairing method as claimed in claim 3, wherein, for a given measurement module, when, after the number of columns of each table has reached the first minimum threshold, the number of row and column pairs identified in one of the tables is lower than the maximum threshold and the number of row and column pairs identified for each of the other tables is higher than the second minimum threshold and contained within one and the same interval of predetermined width, of the order of 5%, of the total number of row and column pairs of the table.

5. The pairing method as claimed in claim 2, wherein, for a given measurement module, when, after the number of columns of each table has reached the first minimum threshold, the number of row and column pairs identified in one of the tables is lower than the maximum threshold and the number of row and column pairs identified for each of the other tables is higher than the second minimum threshold and contained within one and the same interval of predetermined width, of the order of 5%, of the total number of row and column pairs of the table.

6. The pairing method as claimed in claim 1, wherein the first minimum threshold for the number of columns determined for each table is of the order of 30%.

7. The pairing method as claimed in claim 1, wherein the maximum threshold for the number of pairs determined for a table is of the order of 30%.

8. The pairing method as claimed in claim 1, wherein the second minimum threshold for the number of pairs determined for the other tables is of the order of 90%.

9. The pairing method as claimed in claim 1, wherein, for a given measurement module, when, after the number of columns of each table has reached the first minimum threshold, the number of row and column pairs identified in one of the tables is lower than the maximum threshold and the number of row and column pairs identified for each of the other tables is higher than the second minimum threshold and contained within one and the same interval of predetermined width, of the order of 5%, of the total number of row and column pairs of the table.

10. The pairing method as claimed in claim 1, comprising a preliminary step of evaluating the power range of the measured signal emitted by the measurement module and of determining the width of the K intervals of each table.

11. The pairing method as claimed in claim 1, wherein the emitted measured signal takes the form of a pulse train.

12. A computer for a motor vehicle, said vehicle comprising a plurality of wheels, each wheel comprising a measurement module, each measurement module being able to emit, to said computer, at least one measured signal taking the form of at least one pulse received by the computer in the form of a frame of varying power, over at least one interval of a power range divided into K consecutive intervals of the same width, as a function of the position of the measurement module with respect to the computer, the vehicle comprising a plurality of wheel anti-lock modules, each wheel anti-lock module, installed facing a wheel, being able to deliver, to the computer, an orientation signal representative of the angular orientation of said wheel, varying over an angular orientation range divided into M consecutive intervals of the same width, said computer being configured, for each measurement module, so as to:
  for each frame of a received measured signal:
    determine at least one value of the power of said received measured signal,
    determine, at the time of reception of the measured signal, the angular orientation of each wheel on the basis of the orientation signal received from each wheel anti-lock module,
    for each determined power value, identify, in a plurality of predetermined tables, each divided into K rows and M columns respectively associating the power of the measured signal as a function of the angular orientation of each of the wheels, one row and column pair per table, each row and column pair respectively comprising said determined power value and the value of the angular orientation determined for each of the wheels,
  detect that the number of columns determined for each table has reached a first minimum threshold,
  detect that the number of row and column pairs identified in one of the tables is lower than a maximum threshold and that the number of row and column pairs identified in the other tables is higher than a second minimum threshold,
  pair the measurement module with one of the wheels when, after the number of columns determined for each table has reached the first minimum threshold, the number of row and column pairs identified in one of the tables for one of the wheels is lower than the maximum threshold and the number of row and column pairs identified in each of the other tables for the other wheels is higher than the second minimum threshold.

13. The computer as claimed in claim 12, configured so as to perform pairing when, when more than 30% of the columns of each table have been determined, the number of row and column pairs identified in a table is less than 30% of the total number of row and column pairs of the table and the number of row and column pairs identified in each of the other tables is higher than 90% of the total number of row and column pairs of each of the tables.

14. A motor vehicle comprising:
  a computer as claimed in claim 13,
  a plurality of wheels, each wheel comprising a measurement module, each measurement module being able to emit, to said computer, at least one measured signal taking the form of at least one pulse received by the computer in the form of a frame of varying power, over at least one interval of a power range divided into K consecutive intervals of the same width, as a function of the position of the measurement module with respect to the computer, and
  a plurality of wheel anti-lock modules, each wheel anti-lock module, installed facing a wheel, being able to deliver, to the computer, an orientation signal representative of the angular orientation of said wheel, varying over an angular orientation range divided into M consecutive intervals of the same width.

15. A motor vehicle comprising:
  a computer as claimed in claim 12,
  a plurality of wheels, each wheel comprising a measurement module, each measurement module being able to emit, to said computer, at least one measured signal taking the form of at least one pulse received by the computer in the form of a frame of varying power, over at least one interval of a power range divided into K-consecutive intervals of the same width, as a function of the position of the measurement module with respect to the computer, and
  a plurality of wheel anti-lock modules, each wheel anti-lock module, installed facing a wheel, being able to deliver, to the computer, an orientation signal representative of the angular orientation of said wheel, varying over an angular orientation range divided into M consecutive intervals of the same width.

* * * * *